United States Patent [19]

Hall et al.

[11] Patent Number: 4,820,122

[45] Date of Patent: Apr. 11, 1989

[54] DIRT REMOVAL MEANS FOR AIR COOLED BLADES

[75] Inventors: Kenneth B. Hall, Jupiter; Thomas A. Auxier, Palm Beach Gardens; Wesley D. Brown, Jupiter, all of Fla.

[73] Assignee: United Technologies Corporation, Hartford, Conn.

[21] Appl. No.: 185,227

[22] Filed: Apr. 25, 1988

[51] Int. Cl.⁴ .............................................. F01D 5/18
[52] U.S. Cl. ........................................ 416/97 R; 416/92
[58] Field of Search ................... 416/92, 97 R, 96 R, 416/97 A

[56] References Cited

U.S. PATENT DOCUMENTS

| | | |
|---|---|---|
| 2,632,626 | 3/1953 | McClintock . |
| 3,220,697 | 11/1965 | Smuland et al. . |
| 3,356,340 | 12/1967 | Bobo . |
| 3,533,711 | 10/1970 | Kercher ........................... 416/96 R |
| 3,533,712 | 10/1970 | Kercher ........................... 416/96 R |
| 3,588,277 | 6/1971 | Howald ............................ 416/96 R |
| 3,628,885 | 12/1971 | Sidenstick et al. ............... 416/97 R |
| 3,635,586 | 1/1972 | Kent et al. ....................... 416/97 |
| 3,918,835 | 11/1975 | Yamarick et al. ................ 416/95 |
| 3,989,412 | 11/1976 | Mukherjee ....................... 416/97 |
| 4,026,659 | 5/1977 | Freeman, Jr. ..................... 415/115 |
| 4,309,147 | 1/1982 | Koster et al. .................... 416/95 |
| 4,456,428 | 6/1984 | Cuvillier ........................... 416/97 |
| 4,474,532 | 10/1984 | Pazder ............................. 416/97 |
| 4,515,526 | 5/1985 | Levengood ...................... 416/96 |
| 4,522,562 | 6/1985 | Glowacki et al. ................ 416/95 |
| 4,529,357 | 7/1985 | Holland ............................ 416/92 |
| 4,604,031 | 8/1986 | Moss et al. ....................... 416/92 X |

FOREIGN PATENT DOCUMENTS 34961 9/1981 European Pat. Off. .......... 416/97 R

Primary Examiner—Everette A. Powell, Jr.
Attorney, Agent, or Firm—Norman Friedland

[57] ABSTRACT

Dirt removal means for an internally air cooled blade for a gas turbine engine of the type that includes multi passes some of which are serpentine as made in situ by casting the ribs so as to be angularly disposed at the root of the blade and a straight through passageway with an opening at the tip. The velocity of the airstream in the straight through passageway being sufficiently high to carry the dirt through the opening and the angularly disposed ribs overlying the entrance to the other passageway so as to divert the dirt entrained airstream into the straight through passageway while allowing relatively dirt-free air to turn the angle of the rib to enter the serpentine passes.

3 Claims, 1 Drawing Sheet

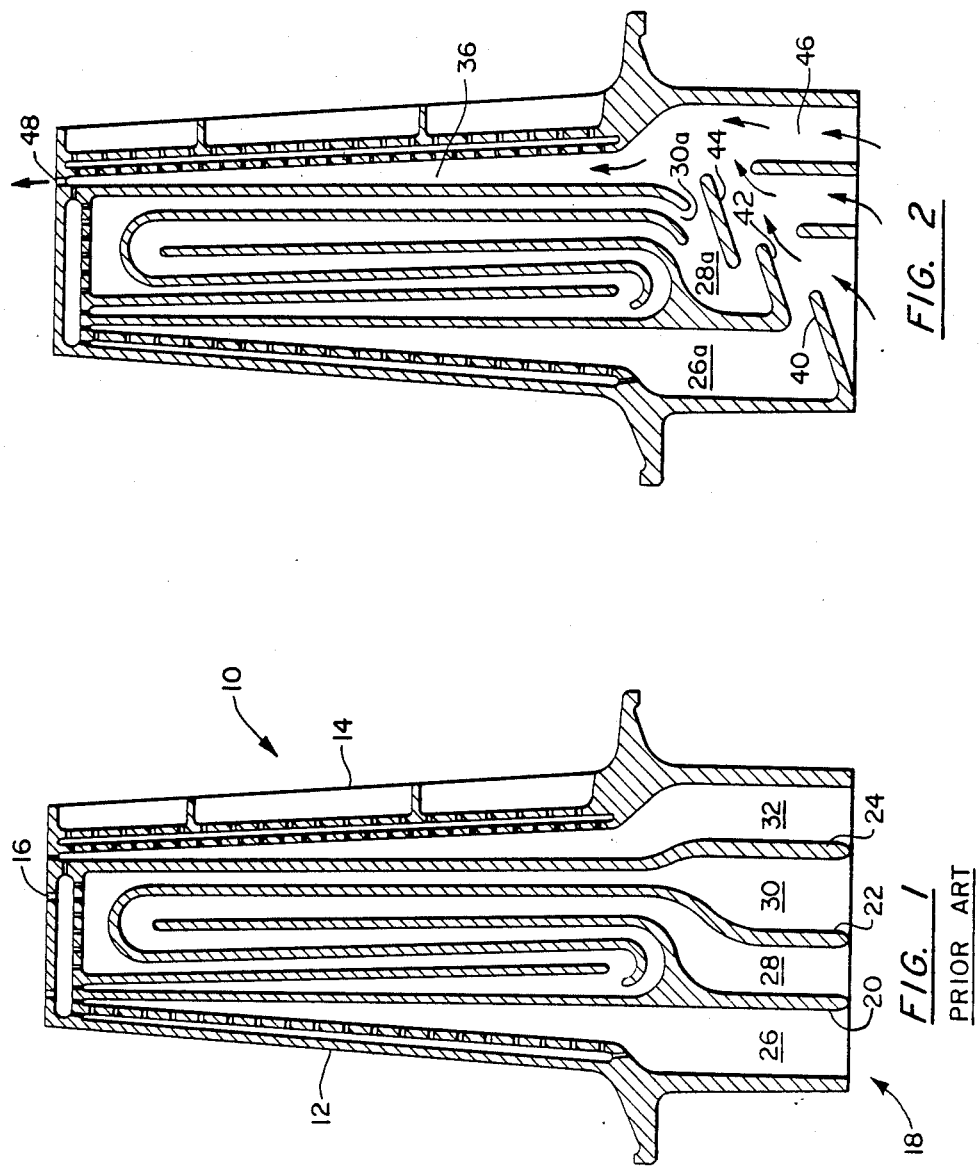

DIRT REMOVAL MEANS FOR AIR COOLED BLADES

This invention was made under a Government Contract and the Government has rights herein.

CROSS REFERENCE TO RELATED APPLICATIONS

This application relates to commonly assigned, co-pending, U.S. patent application Ser. No. 185,226, filed by Kenneth B. Hall on even date herewith and bearing the same title as the herein invention.

TECHNICAL FIELD

This invention relates to cooled blades of a rotor of a gas turbine engine and particularly for controlling foreign matter contained in the cooling air so as to prevent clogging of the cooling air holes or passages in the blade.

BACKGROUND ART

It is well known that engine parts, particularly the blades of the turbine of aircraft gas turbine engines are cooled by use of engine cooling air. For example, cooling of the turbine blades is attained by routing cooling air from the engine's compressor through a TOBI (turbine on-board injector) which is then fed through internal passages formed within the blade. The air is ultimately discharged through openings in the turbine blades and may be returned to the engine's gas path.

Equally well known is the fact that foreign matter, either acquired through the ambient environment or self-generated within the engine, ingests into the cooling airstream and has the propensity of clogging these cooling passages and openings referred to in the above. Obviously, aircraft that is operating in areas where dust is at high levels, such as in the sandy areas of certain geographic locations of the world, the problem becomes exasperated.

Many attempts have been made to alleviate these problems and examples of such attempts are disclosed, for example, in U.S. Pat. No. 3,356,340 granted to M. Bobo on Dec. 5, 1967, U.S. Pat. No. 4,309,147 granted to W. E. Koster et al on Jan. 5, 1982, U.S. Pat. No. 2,632,626 granted to F. A. McClintock on Mar. 24, 1953 and U.S. Pat. No. 3,918,835 granted to G. J. Yamarik on Nov. 11, 1975, the latter two patents being assigned to United Technologies Corporation, the assignee of this patent application.

In each of these instances the cooling air passes through a tortuous route before reaching the turbine cooling passages so that the foreign particles in the cooling airstream are diverted from the turning cooling airstream or the cooled air entrained dirt is admitted to a centrifugal field where the heavier foreign particles are centrifuged to a surface and retained there until the engine is disassembled and cleaned. The U.S. Pat. No. 3,918,835 discloses a centrifugal type of dirt separator and provides an inclined surface that directs the collected dirt particles toward the labyrinth seal where it migrates thereto and is carried through the seal by the leakage air.

In other types of dirt separators or removal schemes, mechanisms upstream of the turbine are provided so as to prevent the dirt from reaching the turbine blades. Historically, such schemes would include a ramp mounted ahead of the TOBI. The ramp serves to deflect and prevents the dirt from making the sharp turn that is require for the cooling air to get into the TOBI. This has met with some success where the dirt particles are sufficiently large so that the inertia of the particle overcomes the velocity of the cooling airstream causing the particle to continue its travel while the air makes a turn. However, smaller sized particles would be influenced by the cooling stream velocity and would turn with the air and hence be carried into the blade cooling passages and holes. This resulted in dirt buildup in passages and clogging of holes which adversely affected the cooling ability of the cooling system. Obviously, this blockage can result in distress or failure of the airfoil or reduce the pressure of the cooling air supplied to the vane upstream of the turbine. To overcome the pressure loss it would be necessary to increase coolant outflow which, in turn, would increase the burner pressure drop and thereby adversely affect engine performance.

We have found that we can obviate the problems enumerated in the above by designing the blade itself to carry its own dirt removal system, hence providing a method to make the cooled turbine blades tolerant to dirt or dust contaminating the cooling air. Inherently, such a system would eliminate the need of the upstream air cleansing schemes that have been heretofore prevalent in the gas turbine engine technology.

DISCLOSURE OF INVENTION

It is an object of this invention to provide for turbine blade means for deflecting dust and dirt particles immersed in the cooling airstream so as to divert these particles to a particular passage or passages internally of the blade where the dust or dirt is funnelled through the blade and discharged through an opening formed at the blade's tip.

A feature of the invention is to cast the aircraft turbine engine turbine multipassage blade with internal baffles such that the baffles guide the entrained dirt into a preselected passage internally of the blade where the velocity of the cooling air in that passage carries the entrained dirt to a dirt removal hole formed in the tip of the blade.

The foregoing and other features and advantages of the present invention will become more apparent from the following description and accompanying drawings.

BRIEF DESCRIPTION OF THE DRAWINGS

FIG. 1 is a view partly in section and schematic illustrating a prior art air cooled turbine blade design.

FIG. 2 is a view similar to FIG. 1 incorporating the present invention.

BEST MODE FOR CARRYING OUT THE INVENTION

For a detailed description of a cooled turbine blade for an aircraft gas turbine engine, reference should be made to U.S. Pat. No. 4,479,532, granted to M. J. Pazder on Oct. 2, 1984, and assigned to the same assignee as this patent application.

For the sake of simplicity and convenience the detail of the blades is omitted from the drawings illustrated in FIGS. 1 and 2 and only the essential portions necessary for an understanding of the invention will be detailed. As will be understood, the internal construction of the blade may utilize any of the heat transfer enhancement schemes that are known in this technology. Hence, it is contemplated that the airfoil would incorporate the requisite trip strips, pedestals, vanes and the like to achieve the desired cooling.

The prior art design is illustrated in FIG. 1 showing the interior of the airfoil section taking a section through the longitudinal or spanwise axis. The airfoil section 10 of the blade is partitioned by a plurality of ribs into a plurality of subpassages. As noted, the blade comprises the leading edge 12, trailing edge 14, tip 16 and root end 18. Ribs 20, 22 and 24 define four passages 26, 28, 30 and 32 extending in the spanwise direction, rib 20 is bifurcated defining additional subpassages for defining serpentine passages with rib 30. As is well known each of the passages and the impingement sections are designed to accomplish well defined objectives, which are not dealt with in this patent application. The design of these high technology cooled turbine blades require a significant number of holes which also have well defined objectives.

It is apparent from the foregoing that the cooling air admitted into these passages is entrained with foreign matter, and this foreign matter more likely than not will adhere to the walls of the passages and/or clog the holes.

According to this invention and referring particularly to FIG. 2, which incorporates the high technology heat transfer enhancement techniques (not shown), the ribs are modified in such a manner as to form deflectors for the dirt entrained cooling air so that all or a significant amount of the dirt entrained air is directed to the trailing edge passage 36; the passages being rearranged to provide for the dirt removal.

As noted in FIG. 2, similar components have like reference numerals and where the component is modified a subscript "a" has been added. The angled rib portions 40, 42 and 44 are disposed at the root portion of the blade in proximity to the inlet of passages 26a, 28a and 30a and as noted are inclined from the root to the tip and extend in the chord direction and are cast into the blade. These rib portions 40, 42 and 44 serve to deflect the cooling air entrained with dirt in a direction toward the trailing edge passage 36. Passage 36 is specifically designed as a straight through passage and is directly communicating with the inlet air admitted into the root in passage 46. A dirt removal hole 48 is formed at the tip end of passage 36 to discharge the dirt entrained air into the engine's gas path. The purpose of designing passage 36 with as little, if any, turns is to assure that the velocity of the cooling airstream is sufficient to flow the dirt directly out through the dirt removal hole 48.

The other passages 26a, 28a and 30a are thus substantially free of dirt. In addition to providing for a dirt removal system directly in the blade, by selectively directing the dirt through the passage with the high velocity cooling airstream, it is now possible to eliminate the many purge holes that heretofore have been designed with these blades. This obviates the problem of utilizing a large amount of air that is not being utilized solely for cooling and as experience has shown, the air velocity in some of these passages associated with the purge air holes is relatively low which impedes or limits the removal of dirt.

Although this invention has been shown and described with respect to detailed embodiments thereof, it will be understood by those skilled in the art that various changes in form and detail thereof may be made without departing from the spirit and scope of the claimed invention.

We claim:

1. An internally cooled blade for a gas turbine engine, said blade having a root section and tip section, wall means between said root section and tip section defining the airfoil of said blade, a plurality of ribs defining passageways extending spanwise in said blade for communicating cooling air through said blade discharging into the turbine engine's gas path through apertures formed in said airfoil, means for preventing dirt from clogging said apertures, said means including at least one straight through passageway and hole formed in said tip section sized for the largest particle of dirt anticipated to be entrained in said cooling air, and at least one rib at the root section having a baffle-like shaped portion angularly disposed relative to said passageways for directing the dirt entrained air into said straight through passageway and preventing said dirt entrained air from entering said other passageways.

2. An internally cooled blade as claimed in claim 1, wherein said blade is a turbine blade.

3. An internally cooled blade as claimed in claim 2, wherein the root of the blade includes additional ribs angularly disposed relative to the entrance to said passageways and spaced therefrom, at least one of said ribs being a portion of the wall defining at least one of said passageways.

* * * * *